Figure 1:
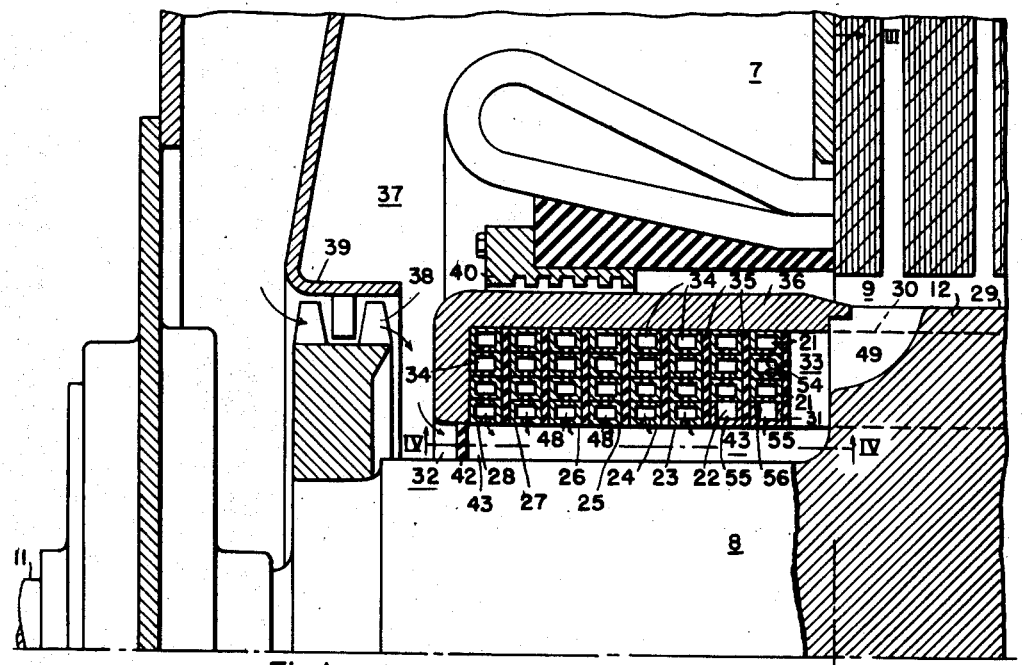

Sept. 22, 1953 — R. A. BAUDRY ET AL — 2,653,255
SEPARATE END-TURN ROTOR-VENTILATION
Filed July 26, 1952 — 3 Sheets-Sheet 1

WITNESSES:
E. A. McCloskey
Wm. B. Sellers

INVENTORS
René A. Baudry
and Paul R. Heller.
BY O. B. Buchanan
ATTORNEY

Patented Sept. 22, 1953

2,653,255

UNITED STATES PATENT OFFICE 2,653,255

SEPARATE END-TURN ROTOR-VENTILATION

René A. Baudry, Pittsburgh, and Paul R. Heller, Irwin, Pa., assignors to Westinghouse Electric Corporation, East Pittsburgh, Pa., a corporation of Pennsylvania Application July 26, 1952, Serial No. 301,073

6 Claims. (Cl. 310—64)

Our invention relates to turbine generators or other synchronous dynamo-electric machines of the type having a solid, cylindrical-core, rotor-member carrying a distributed, concentric-coil, field-winding of the hollow-conductor type. Most of such machines are hydrogen-cooled. Most turbine generators are two-pole synchronous machines, although our invention may be applicable also to machines having a larger pole-number, such as four or more.

The rating of such a rotor-winding is dependent upon the length of the coil and upon the mass of the gas flowing through the ducts. As the length increases, the total heat which is dissipated from the conductor to the cooling-gas also increases, making the exit-gas hotter, while the greater gas-friction tends to reduce the flow. As a result, the $I^2R$ losses per unit length of the coil must be reduced, as the length increases, in order to maintain a given maximum temperature in the conductor. For example, a hollow-conductor rotor-coil having a duct-length of 120 inches will have a rating of only something like 80% of the rating of a coil having a duct-length of 80 inches, other conditions being equal.

In such a machine, having (for example) a rotor of 37 inches in diameter, and having a half-corelength of 80 inches, the last end-turn, or the end-winding portion of the outer coil of each pole, will add approximately an additional 45 inches to the coil-length that must be cooled, making a total length of 125 inches. On shorter machines, the ratio of end-turn length to half-corelength will be greater. On longer machines, the increased length of the ducts within the hollow rotor-conductors will make a reduction of the total duct-length more imperative, because the duct-length imposes rapidly increasing reductions in the rotor-rating, as the length increases more and more. Consequently, if the end-turns of the hollow-conductor rotor-windings of turbine generators can be cooled separately from the slot-lying coil side portions, an appreciable gain can be realized in the rotor-rating.

Our invention relates to means for achieving the aforesaid separating cooling of the end-turns of the rotor-windings of turbine generators.

A simplified and somewhat diagrammatically indicated machine is shown in the accompanying drawing, by way of example, embodying our invention in a form which is intended to be illustrative of the general principles of our invention, in one illustrative form of embodiment, without making any attempt at depicting an exact-scale working-drawing of a complete machine. In the drawing, Figure 1 is a fragmentary longitudinal sectional view of an illustrative machine embodying our invention, the section-plane passing through a point near the center-line of a rotor-pole, as indicated by the line I—I in Figs. 3 and 4.

Figure 2:
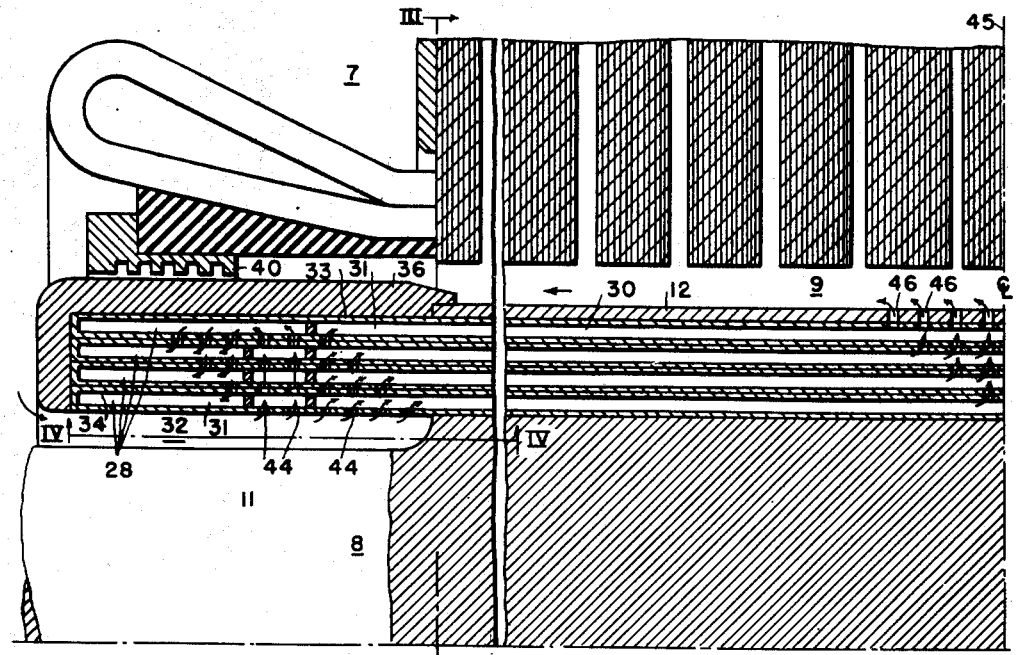
Figure 3:
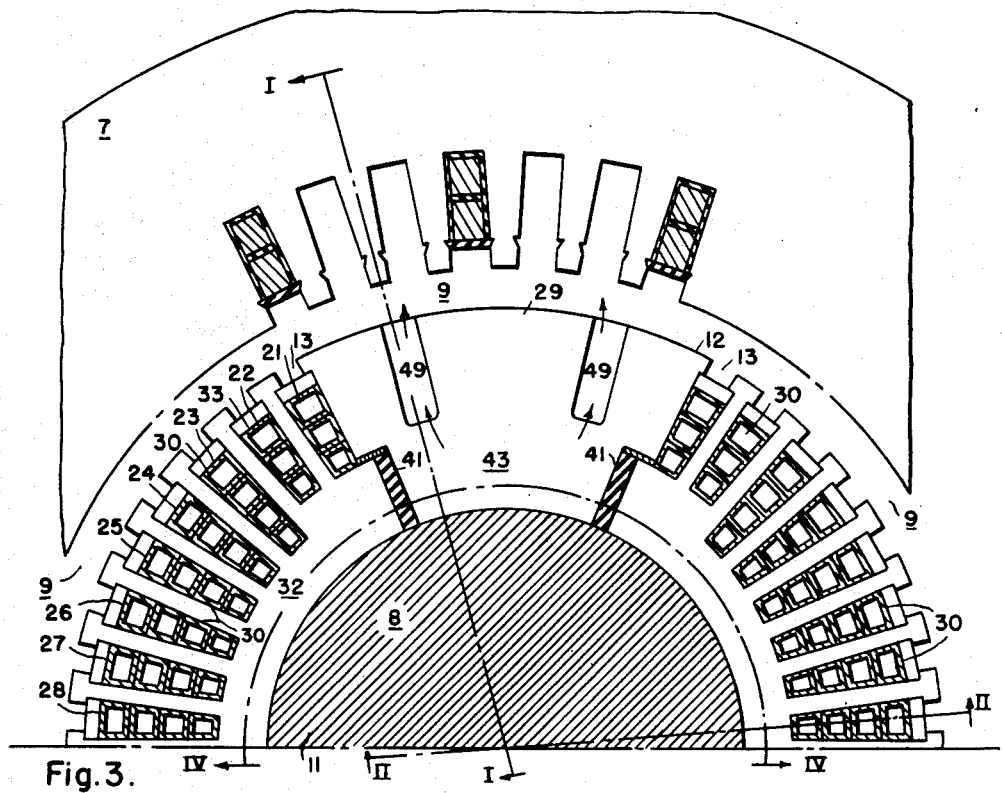
Figure 4:
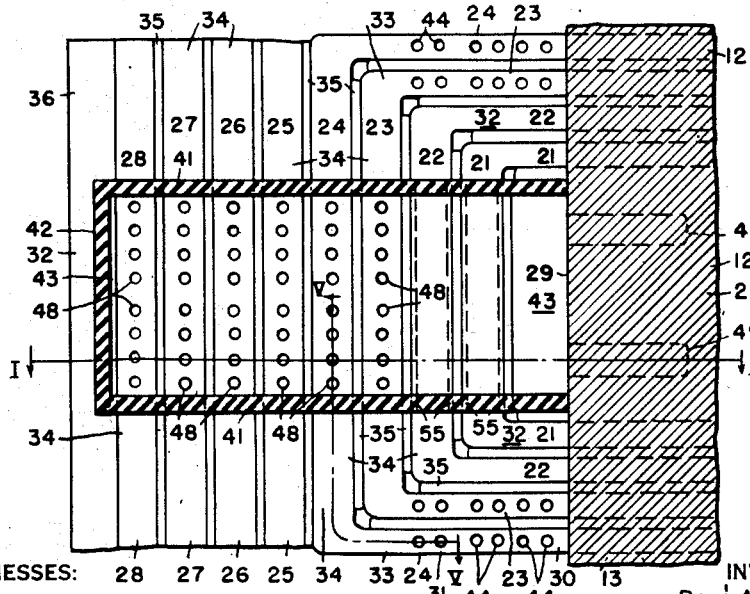
Figure 5:
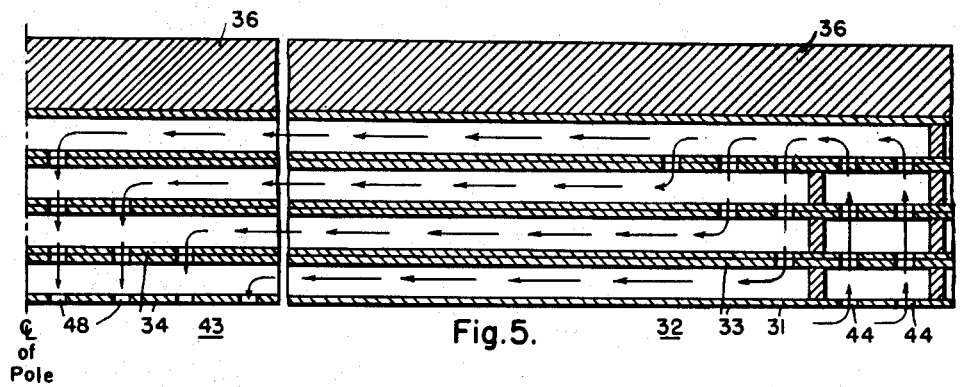
Figure 6:
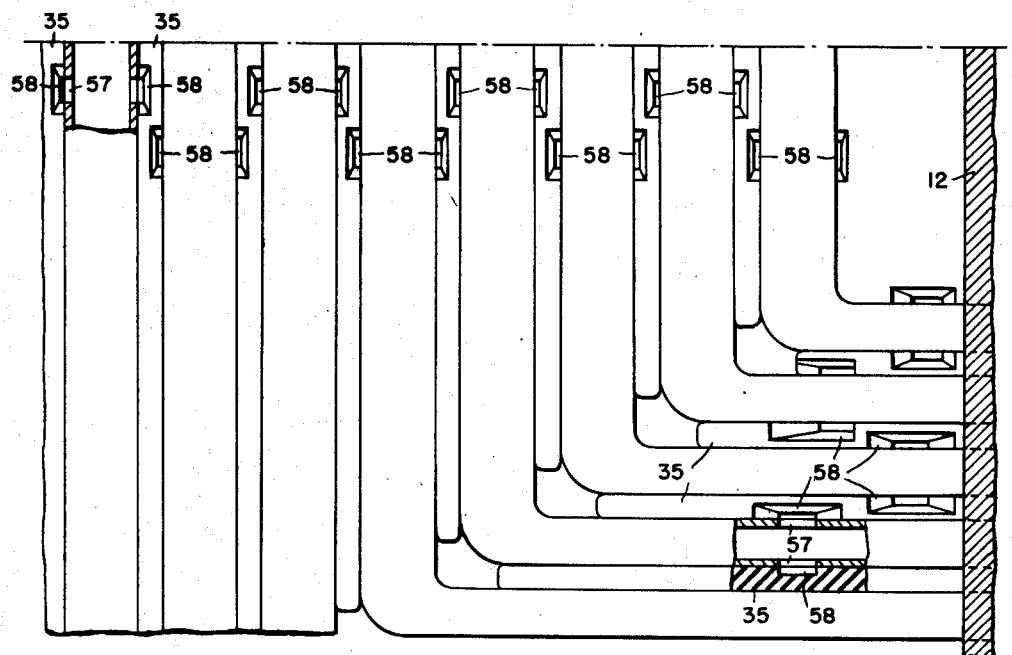
Figure 7:
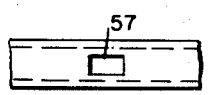

Fig. 2 is a similar view of a different portion of such a machine, the section-plane passing through the outer coil-sides of one of the poles of the rotor member, as indicated by the line II—II in Fig. 3, Fig. 3 is a transverse section on the line III—III in Figs. 1 and 2, Fig. 4 is a developed underview, shown as a cylindrical section, looking outwardly from the surface of a cylinder which is indicated at IV—IV in Figs. 1, 2 and 3, Fig. 5 is a developed section through a portion of the outer rotor-coil, shown as if it is straightened out, to show the path of the backwardly-flowing end-winding cooling-gas, as seen on the curved section-line V—V in Fig. 4, Fig. 6 is a developed underview, similar to Fig. 4, showing a modification using laterally vented hollow conductors, and Fig. 7 is a detailed side elevation of a portion of one of the laterally vented hollow conductors of Fig. 6.

We have illustrated our invention as being applied to a 2-pole synchronous dynamo-electric machine, comprising a stationary armature-member 7 and a rotating field-member 8 having an airgap 9 therebetween. The rotating field-member, as shown in Fig. 3, includes a shaft 11, a cylindrical rotor-core 12 having winding-receiving rotor-slots 13, and a distributed, hollow-conductor, direct-current field-winding, each pole of the field-winding comprising a plurality of concentric coils, 21 to 28, spanning an unslotted pole-center portion 29 of the rotor-core 12.

The concentric rotor-coils 21 to 28 are shown, for the sake of simplicity, as having only four turns each, except for the two innermost coils 21 and 22 of each pole, which have three turns each, it being understood, however, that usually a larger number of turns per coil will be used. These rotor-coils 21 to 28 have straight slot-lying hollow-conductor coil-side portions 30, which lie within the respective rotor-slots 13. The coils also have end-windings 31 which extend out beyond the ends of the rotor-core 12, and which have underspaces 32 thereunder, that is, between the respective end-windings 31 and the rotor-shaft 11 at the respective ends of the rotor-member 8. Each of the end-windings 31, at the respective ends of the field-member, includes both axially and circumferentially extending hollow-conductor end-winding portions, as indicated at 33 and 34, respectively, spaced by end-blocking pieces 35. In accordance with a common practice, each of the end-windings 31, at the respective ends of the rotor-member 8, is held in place by a retaining ring 36, which is secured to the end of the rotor-core 12, in such position as to surround its end-windings 31 at that end of the rotor-member.

Gas-circulating means must be provided, for providing a pressurized gas-chamber beyond at least one end, and preferably both ends, of the field-member 8. Such a pressurized chamber is shown at 37 in Fig. 1, and the high gaseous pressure therein is produced by means of a fan 38 which is carried by the rotor-shaft 11, said fan being surrounded by a suitable shroud or partition-member 39. As shown in our copending application on Generator Cooling, Serial No. 282,982, filed April 18, 1952, the stator member 7 is provided with an airgap-baffle 40 also shown, which surrounds the retaining ring 36, for preventing an excessive loss of pressure from said pressurized chamber 37 to the airgap 9.

As shown in Fig. 4, the underspace 32, under each of the rotor end-windings 31, is provided with axially and circumferentially extending partition-means 41 and 42, for separating said underspace 32 into a plurality of different parts. In particular, under the circumferentially extending hollow-conductor end-winding portions 34, which lie in alignment with the unslotted pole-center portion 29 of each rotor-pole, the aforesaid partition-members 41 and 42 provide a partitioned-off gas-discharging end-winding underspace 43, it being understood that there is one such partitioned-off underspace 43 for each of the two poles of the rotor-member 8. Except for these partitioned-off pole-center underspaces 43, the underspace 32 underneath the end-windings 31 serves as an intake-space, in communication with the high-pressure chamber 37, for admitting the cooling gas which is needed for cooling the hollow conductors of the rotor-coils 21 to 28.

As shown in Figs. 2 and 4, the axially extending end-winding portion 33, of each of the axially-extending hollow-conductor field-winding coils 21 to 28, except sometimes the innermost coil or coils 21 and 22, is provided with gas-inlet holes 44, disposed at points near that end of the rotor-core 12, for providing a communication from the unpartitioned underspace or intake-space 32 into the hollow portions or ducts of the several hollow conductors. The cooling-gas which thus enters into the hollow conductors of the outermost rotor-coils 23 to 28 thereupon divides, part of it flowing forwardly, to cool the straight coil-side portions 30, as far as the center line 45 of the machine, while the other part of the cooling gas flows backwardly, for cooling the end-windings 31.

The forwardly flowing gas-stream, flowing in the coil-side portions 30 of the rotor-conductors, is discharged, near the center line 45 of the machine, through a first outlet vent-means, in the form of outlet-holes 46 (Fig. 2), which open from the ducts of the hollow conductors into the airgap 9 at the middle or intermediate portion of the rotor-core 12. The backwardly flowing gas-stream, flowing in the end-windings 31 of the rotor-conductors, is vented by a second outlet vent-means, including outlet-holes 48 (Figs. 1 and 4), which open from the circumferentially extending hollow-conductor end-winding portions 34 into the partitioned-off gas-discharging end-winding underspaces 43 for the respective poles of the rotor-member 8. This second outlet vent-means, starting with the holes 48, also includes means for providing gas-flow from said partitioned-off pole-center underspace 43 to the airgap 9, as by means of notches 49 cut in the unslotted pole-center portion 29 of the rotor-core 12, as shown in Figs. 1, 3 and 4.

In many machines, including the one which has been chosen for illustration, the innermost coils 21 and 22 of the field-winding may have end-winding portions 31 which are too short to admit of the separate end-winding cooling which has just been described, and their axially extending end-winding portions 33 may be too short to admit of the provision of a sufficient number of gas-inlet holes 44 therein. These innermost coils 21 and 22, however, commonly have a smaller number of turns per coil, than the rest of the coils 23 to 28, of the rotor-winding. In accordance with one feature of our invention, therefore, we have taken advantage of these circumstances to provide the circumferentially extending hollow-conductor end-winding portions 34 of said inner coil or coils 21 and 22 with gas-inlet holes 54, as shown in Fig. 1. Underneath these circumferentially extending end-winding portions 34, of said inner coils 21 and 22, we provide an open-ended gas-inlet tube-forming member, shown as a channel-member 55, which extends circumferentially across the partitioned-off pole-center underspace 43, disposed under the circumferentially extending end-winding portion 34 of the bottom turn of each of the innermost coils 21 and 22, as shown in Fig. 4. Thus, both ends of this gas-inlet tube 55 are open, and in free communication with the unpartitioned intake-underspace 32. This gas-inlet tube 55 is provided with a hole or holes 56, shown as the open top of the channel 55, which communicates with the gas-inlet holes 54 of the associated inner concentric coil or coils 21 and 22.

The operation of our invention will be obvious from the foregoing description. Fig. 5 shows a detail of the path of the backwardly flowing end-winding cooling-gas, while Fig. 2 shows the path of the forwardly flowing gas-stream which cools the straight coil-side portions of all except the two innermost coils 21 and 22. The cooling of these innermost coils 21 and 22 is clearly shown in Figs. 1, 3 and 4, whereby gas enters from the intake-underspace 32, into the tube or channel-members 55 and thence into the gas-inlet holes 54 in the centers of the end-windings 31 of these two innermost coils 21 and 22, said gas being discharged from said two innermost coils 21 and 22 into the airgap 9, at or near the center line 45 of the machine in a manner similar to that which is depicted for the outermost coil-side in Fig. 2.

It will thus be seen that we have provided an effective means for reducing the length of the hollow-conductor ducts through which the rotor cooling-gas must pass, thereby increasing the effectiveness of the rotor-cooling, and consequently increasing the rating of the rotor-members of our turbine generators. It will further be seen that we have done this without, in any way, weakening or impairing the mechanical strength of the retaining ring 36, which is necessary to resist the high centrifugal forces of the rotor-members of these large, high-speed machines.

Instead of using hollow rotor-winding conductors having their inlet and outlet vent-holes 44, 46 and 48 in their horizontal side-walls, as shown in Figs. 1–5, the conductor-vents could be formed in the vertical side-walls of the hollow conductors, as shown at 57 in Figs. 6 and 7. In this case, the end-blocking pieces 35 would be grooved to provide ducts 58 leading to the laterally placed vent-holes 57 of the hollow conductors.

While we have illustrated our invention in only two very much simplified exemplary forms of embodiment, we wish it to be understood that we are not limited to the precise illustrated details.

We claim as our invention:

1. A synchronous dynamo-electric machine comprising a stationary armature-member and a rotating field-member having an airgap therebetween, said rotating field-member including a shaft, a cylindrical rotor-core having winding-receiving rotor-slots, and a distributed hollow-conductor direct-current field-winding, each pole of the field-winding comprising a plurality of concentric coils spanning the pole-center, said concentric coils having slot-lying hollow-conductor coil-side portions lying within the respective rotor-slots, and having end-windings having spaces thereunder, between the respective end-windings and the field-member shaft at the respective ends of the rotating field-member, each of said end-windings, at the respective ends of the field-member, including both axially and circumferentially extending hollow-conductor end-winding portions, disposed outside of the rotor-core at the respective ends of said rotor-core, said field-member further including retaining rings surrounding the respective end-windings of the field-winding, means for blowing a cooling gas axially into an intake-space under at least one of said retaining-rings, at at least one end of the field-member, and under the end-winding portion at that end of the rotor-core, gas-inlet means for admitting the cooling gas from said intake-space into each of the hollow conductors of the field-winding at that end of the field-member, said gas-inlet means including gas-inlet holes disposed in the hollow conductors, a plurality of said gas-inlet holes being in axially extending hollow-conductor end-winding portions at points near that end of the rotor-core, a first outlet vent-means, including holes opening into said airgap from said hollow-conductor coil-side portions at an intermediate portion of the rotor-core, for venting a forwardly flowing portion of said cooling gas after it has blown partially through said slot-lying hollow-conductor coil-side portions of the field-winding, and a second outlet vent-means, including outlet-holes opening from circumferentially extending hollow-conductor end-winding portions for providing gas-flow to said airgap, for venting a backwardly flowing portion of said cooling gas after it has blown partially through at least some of said end-winding portions of the field-winding at the same intake-end of the field-member at which the cooling gas was introduced into the hollow conductors.

2. The invention as defined in claim 1, characterized by said second outlet vent-means including partitioning-means, disposed under the circumferentially extending hollow-conductor end-winding portions at said intake-end of the rotor-core, for providing a plurality of partitioned-off gas-discharging end-winding underspaces at said intake-end, gas-flow passages, disposed within the respective pole-center portions of the rotor-core, for venting said partitioned-off gas-discharging underspaces to the airgap, said outlet-holes in said circumferentially extending hollow-conductor end-winding portions being in communication with the respective partitioned-off gas-discharging underspaces.

3. The invention as defined in claim 2, characterized by the inner concentric coil or coils of each rotor-pole having fewer turns than the other coils, and having gas-inlet holes in the circumferentially extending hollow-conductor end-winding portions of said inner concentric coil or coils of each rotor-pole at the intake-end of the rotor-core, in combination with an open-ended gas-inlet tube-forming member extending circumferentially across each partitioned-off gas-discharging end-winding underspace of the rotor-member, each gas-inlet tube being disposed under the circumferentially extending hollow-conductor end-winding portion of the bottom turn or turns of its inner concentric coil or coils, said gas-inlet tubes having a hole or holes communicating with the gas-inlet holes of its associated inner concentric coil or coils.

4. A synchronous dynamo-electric machine comprising a stationary armature-member and a rotating field-member having an airgap therebetween, said rotating field-member including a shaft, a cylindrical rotor-core having winding-receiving rotor-slots, and a distributed hollow-conductor direct-current field-winding, each pole of the field-winding comprising a plurality of concentric coils spanning the pole-center, said concentric coils having slot-lying hollow-conductor coil-side portions lying within the respective rotor-slots, and having end-windings having spaces thereunder, between the respective end-windings and the field-member shaft at the respective ends of the rotating field-member, each of said end-windings, at the respective ends of the field-member, including both axially and circumferentially extending hollow-conductor end-winding portions, disposed outside of the rotor-core at the respective ends of said rotor-core, said field-member further including retaining rings surrounding the respective end-windings of the field-winding, means for blowing a cooling gas axially into an intake-space under each of said retaining-rings and under their respective end-windings, gas-inlet means for admitting the cooling-gas from each of said intake-spaces into each of the hollow conductors of the field-winding at that end of the field-member, said gas-inlet means including gas-inlet holes disposed in the hollow conductors, a plurality of said gas-inlet holes being in axially extending hollow-conductor end-winding portions at points near that end of the rotor-core, a first outlet vent-means, including holes opening into said airgap from said hollow-conductor coil-side portions at an intermediate portion of the rotor-core, for venting a forwardly flowing portion of said cooling gas after it has blown partially through said slot-lying hollow-conductor coil-side portions of the field-winding, and a second outlet vent-means, including outlet-holes opening from circumferentially extending hollow-conductor end-winding portions for providing gas-flow to said airgap, for venting a backwardly flowing portion of said cooling gas after it has blown partially through at least some of said end-winding portions of the field-winding at the particular intake-end of the field-member at which that backwardly flowing cooling gas was introduced into the hollow conductors.

5. The invention as defined in claim 4, characterized by said second outlet vent-means including partitioning-means, disposed under the circumferentially extending hollow-conductor end-winding portions at each end of the rotor-core, for providing a plurality of partitioned-off gas-discharging end-winding underspaces at each end, gas-flow passages, disposed within the respective pole-center portions of the rotor-core, for venting said partitioned-off gas-discharging underspaces to the airgap, said outlet-holes in said circumferentially extending hollow-conductor end-winding portions being in communication with the respective partitioned-off gas-discharging underspaces.

6. The invention as defined in claim 5, characterized by the inner concentric coil or coils of each rotor-pole having fewer turns than the other coils, and having gas-inlet holes in the circumferentially extending hollow-conductor end-winding portions of said inner concentric coil or coils of each rotor-pole at each intake-end of the rotor-core, in combination with an open-ended gas-inlet tube-forming member extending circumferentially across each partitioned-off gas-discharging end-winding underspace of the rotor-member, each gas-inlet tube being disposed under the circumferentially extending hollow-conductor end-winding portion of the bottom turn or turns of its inner concentric coil or coils, said gas-inlet tubes having holes communicating with the gas-inlet holes of its associated inner concentric coil or coils.

RENÉ A. BAUDRY.
PAUL R. HELLER.

No references cited.